2,711,958

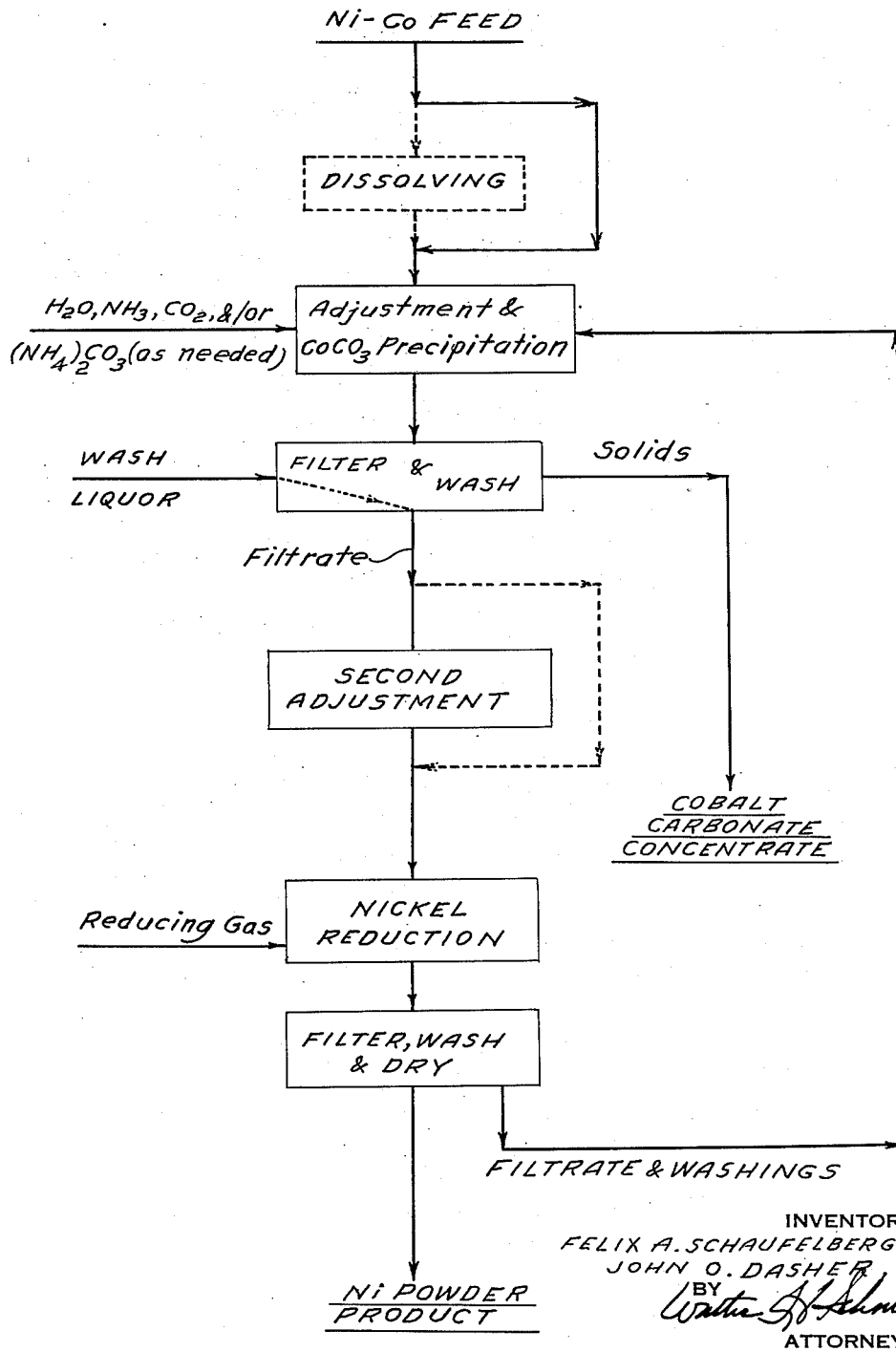

THE SEPARATION OF NICKEL FROM A MIXTURE CONTAINING SOLUBLE COMPOUNDS OF NICKEL AND COBALT

Felix A. Schaufelberger, Yonkers, and John O. Dasher, Garden City Park, N. Y., assignors to Chemical Construction Corporation, New York, N. Y., a corporation of Delaware Application September 23, 1952, Serial No. 310,955

4 Claims. (Cl. 75—119)

This invention relates to the hydrometallurgy of nickel and cobalt. More specifically, it is concerned with a selective separation of nickel, acceptably free of cobalt, from solutions containing salts of both nickel and cobalt. Still more particularly, it involves a method of selective separating of nickel from solutions containing a low mol ratio of nickel to cobalt in which the nickel content is recovered as metallic powder and substantial cobalt is separated as cobalt carbonate.

Nickel and cobalt metals are very similar in many physical and chemical characteristics. The same is true of their salts and naturally-occurring minerals. Moreover, minerals of both generally occur together in natural deposits and usually cannot be separated by ordinary dressing practices. For these reasons, both metals are generally present, in varying amounts, in any solution resulting from any type of leaching of materials containing cobalt and nickel.

This results in many technical and economic problems. For example, in most ordinary practices, small amounts of cobalt present in nickel ore concentrates represent little of benefit to the nickel producer. Very little cobalt available in such materials is recovered and sold as such, primarily because by current methods the cost of separation equals or exceeds the additional value. Much, if not most, of the cobalt is lost in the slag from nickel smelting. The remainder is sold as "nickel" in nickel metal bullion or cathodes.

Similarly, small amounts of nickel present in cobalt concentrates and, therefore, in the "cobalt" solutions after leaching are of small value. It is generally either discarded, a considerable loss, or is recovered with the "cobalt." In the latter case, the nickel becomes an impurity in the cobalt metal and generally the producer is not paid for it. While certain nickel and cobalt mixed metals are marketable as such, it is usually at a price below the value of the pure metals in separate products.

In conventional metallurgy of nickel and cobalt, then, the presence of smaller but appreciable quantities of either in sources of the other, i. e., in ores, ore concentrates, scrap metals, plant by-products and the like, presents a serious and difficult problem. This problem has heretofore been variously attacked. However, a generally practicable treatment, whereby the bulk of each may be recovered in a separate, relatively-pure metal product, has not been offered.

Many processes have been proposed for separation and recovery of cobalt and nickel from mixed electrolytes. Several have been used quite extensively. Most involve the same two facts, that cobalt is more readily oxidized to the trivalent state than is nickel and that calbaltic hydroxide is relatively more insoluble at lower pH values than is nickelous hydroxide. Unfortunately, the necessary steps are complicated and repetitive, the hydroxides are difficult to filter efficiently and the resultant separations are far from perfect. Moreover, most of them also require large quantities of chemical reagents, many of which are non-regenerative. In addition to the effect on costs, this creates a disposal problem.

Several methods of separating nickel and cobalt from ammonium carbonate leach liquors also have been proposed. Most of these involve fractional distillation of the ammonium carbonate. Liquor, at different stages in the process, thereby becomes concentrated with either nickel or cobalt. This liquor may then be removed and treated separately. The residue must also be redissolved and retreated separately. However, as processing methods, or as the product metals, these are economically and practically little better than the electrolytic treatments.

Such conventional processes for the production of nickel or cobalt, then, are commercially unsatisfactory as too complicated, wasteful, or uneconomical, or as resulting in products containing undesirably large amounts of the other metal. Neither do they produce salable metals. The resultant oxide or hydroxides must be processed further to obtain this result.

In copending application for United States Letters Patent Serial No. 276,712 filed March 14, 1952, now Patent No. 2,694,006, by P. J. McGauley and F. A. Schaufelberger, the latter one of the applicants herein, an improved method is disclosed capable of separate precipitation of cobalt and nickel, as metallic powder, from solutions containing salts of both. Broadly, the method comprises first preparing a relatively dilute aqueous solution containing cobalt, nickel and usually ammonium salts, generally as sulfates. This solution is then treated, at different but increasing elevated temperatures, with controlled amounts of ammonia and with a reducing gas. Successive metallic products are precipitated and separately collected. The first precipitate is low-cobalt content nickel metal powder. The final product comprises a low-nickel content cobalt product containing the bulk of the cobalt.

Separation by the above described process may be practiced on original solutions of varying Ni:Co ratios. It works well for Ni:Co mol ratios above about 1:1. At Ni:Co mol ratios of about 5:1, substantial nickel precipitation is obtained in a powder containing less than 1% cobalt. About 85–90% nickel with a cobalt content of less than 0.5% and up to 95–97% with a cobalt content of about 1% is obtainable when treating a solution having a Ni:Co ratio of 20:1. Ratios lower than 1:1 result in decreased efficiency. Where initial Ni:Co mol ratio is low, only a small percentage of nickel may be taken as a first precipitate without an excessive cobalt content. In such instances, it is necessary to coprecipitate nickel together with cobalt. This coprecipitate has a much higher Ni:Co ratio than the original. By recycling or treating it in a separate circuit, a much higher percentage of nickel product of requisite purity can be obtained.

Accordingly, the process of the above described application is practiced with greatest success on materials in which the nickel content is preponderant. However, many ores have Ni:Co ratios below 1:1, cobalt, in some instances, being in great preponderance. Such ores are not amenable to an efficient separation and recovery of the nickel content as pure nickel metal powder by said process.

In accordance with the present invention, an improved process is made available in which materials having a low nickel to cobalt ratio may be treated to produce a nickel metal powder. By the practice of this invention, substantially complete separation of the nickel content of such materials is obtainable. It is, further, surprisingly possible to separate the nickel content as a metallic powder in a substantially cobalt-free condition without taking a coprecipitate of nickel and cobalt. In addition, the present process offers the further advantage of obtaining much of the cobalt as a substantially nickel-free cobalt carbonate.

In general, the process of this invention may be simply stated. Solution or slurry containing a Ni:Co ratio less than one is adjusted to contain ammonia and ammonium salt concentrations, depending upon the cobalt and nickel content, at which all of the nickel and at least so much of the cobalt as is not present as carbonate is put into solution. By proper adjustment of the carbonate content, precipitation of cobalt carbonate is effected sufficient to increase the dissolved Ni:Co mol ratio to at least one, and preferably higher. This precipitate is removed. Residual solution is adjusted, if necessary, to provide a carbonate content, an available ammonia and ammonium salt content suitable for nickel reduction. After reduction, product powder is filtered and washed. Filtrate and washings are recycled to the original adjustment step for additional treatment to recover the residual nickel content.

A detailed description of the invention may be more readily followed by reference to the accompanying drawing. Shown therein is a simplified flow diagram of the principal steps of the process of the present invention.

Where in the present specification and claims the terms "free" or "available" ammonia are used, it is intended to designate any ammonia dissolved per se or as ammonium hydroxide, and any ammonia combined with the metals as metal-ammonium complex ions.

Feed to the present process is designated in the drawing as a nickel-cobalt feed. Except to the extent that the feed has a low Ni:Co ratio, i. e., below about 1:1, its origin is irrelevant so far as the present process is concerned. Methods are know whereby the nickel and cobalt content of various feed sources such as ore concentrates, plant by-products and the like, may be put into solution sufficiently free from extraneous metals and impurities with which they have been previously associated. Any of such methods may have been used as a source of feed herein.

Since the feed is obtained from such sources, it may be in one or more differing physical conditions. It may be and usually is a solution. It also may be in the form of solid salts, oxides and hydrated oxides or hydroxides. Basic sulfates and/or carbonates are commonly encountered. Feed may be in the form of a slurry, in which part of the cobalt-bearing solids are in suspension, the remainder being salts in solution. The procedure of the present invention is applicable for the treatment of feed originally obtained in any of these states.

Where feed is obtained as a solution, there is no problem. If the feed is totally in solid form, at least a part thereof must be dissolved. If it is in the form of slurry, at least a part of the solids will be taken into solution in the suspending fluid. When the cobalt is not in the form of a carbonate, it is dissolved to facilitate precipitation as such.

Since for best operation the solute contents are critical within certain limits, it is also necessary to adjust the solution. Herein, the necessary materials and/or diluents are added to bring the dissolved constituents within the desired or necessary limitations.

In general, in both the dissolving and the adjustment steps, substantially the same limits on the materials in solution are applicable. Therefore, these steps are shown together on the drawing and the conditions applicable to the "solution" for both steps will be considered together.

The applicability of the present process is not limited to the treatment of solutions containing salts of particular acids. Provided the anions do not produce cobalt and nickel salts less soluble than the carbonates, the process may be utilized thereon. Anions, such as cyanide, which form substantially undissociated complexes, should be avoided. As a practical matter, the sulfates and carbonates will be those most commonly encountered and will be taken as illustrative.

As noted above, ordinarily the feed will have resulted from operations to eliminate metallic elements other than cobalt and nickel. For practical purposes, therefore, the materials to be considered in the adjustment may be limited. They are the dissolved quantities of cobalt and nickel salts and the amounts of available ammonia and of ammonium salt. Each of these is important, for one reason or another.

In general, the total dissolved metal content should not be too high. However, concentrations up to an equivalent of about 100 grams/liter metallic nickel plus cobalt if dissolved as carbonate and 135 grams/liter metal if dissolved as sulfates can be handled. A preferred range of from about 40 up to about 65–70 grams/liter for carbonates and 80–90 grams/liter for sulfates constitutes a good average practice. While the process is operable below about 5 grams/liter, such solutions are too dilute to be economically parcticable.

During the present process cobalt carbonate, if not already present, is formed, whether the initial feed solution contains sulfates, carbonates or some other anions. Neither cobalt nor nickel carbonate is sufficiently soluble in water to permit dissolving the amounts of these elements referred to in the previous paragraph. Sufficient solubility here is probably due to the formation of some ammoniacal complex. Formation of the latter requires free ammonia in adequate amount. However, solubility of the complex in the solution depends not only on the available ammonia, but also on the ammonium salt concentration. Solubility is increased by an increase in ammonia and to a lesser extent by an increase in ammonium sulfate. Addition of ammonium carbonate will increase nickel solubility and decrease the solubility of cobalt. Since cobalt is to be precipitated as carbonate, the salt used in adjustment usually will be ammonium carbonate.

Nickel and cobalt form various complexes with ammonia. Those in which the ammonia:metal ratio is about two or more cause a large increase in solubility of salts of these elements in near neutral solution. The amounts of available ammonia and ammonium carbonate required to obtain optimum results will depend to some extent upon the anions present. As to carbonates and sulfates, the principal salts encountered in commercial practice, the amounts of available ammonia is a major factor in keeping the cobalt in solution. Ordinarily, complete nickel solution may be obtained with an available ammonia:dissolved metal mol of about 1.5–2.0. At these ratios, however colbalt solubility in carbonate solution is low, and a higher ratio will generally be used. Too high a ratio, however, will require excessive $CO_2$ in subsequent carbonation. For this reason the ratio usually will not be greater than about four, a good general range being 2.5–3.5.

Nickel solubility is increased with the increasing amounts of either available ammonia or ammonium salt. Since it is necessary to keep nickel in solution selectively with respect to the cobalt, when adding more ammonia would tend to excessively increase cobalt carbonate solubility, it is best to employ the ammonium salt, i. e., the carbonate. The ammonia: metal ratio, therefore, may be kept at about 2.5–3.5 and nickel solubility insured by providing at least one-half mol/liter of ammonium carbonate.

The combination of dissolving and adjustment steps provides for complete solution of nickel and at least part of the cobalt, including cobalt precipitates other than carbonates. Precipitation of cobalt as carbonate is then initiated by increasing the carbonate content of the adjusted solution or slurry. This is most conveniently done by subjecting the solution or slurry to an atmosphere of $CO_2$ at some mild pressure of 0–100 lbs. per square inch gauge. Treatment is continued for sufficient time to precipitate the desired proportion of nickel-free cobalt carbonate necessary to increase the dissolved Ni: Co ratio to at least one, and preferably higher. Since precipitation is obtained by controlling the carbonate content, it may be that after adjustment sufficient carbonate has been precipitated to increase the Ni: Co ratio to the desired extent. Accordingly, "adjustment" and "cobalt carbonate precipitation" have been indicated on the drawing as a joint operation.

Neutralization of ammonia in solution by addition of $CO_2$ is accompanied by liberation of heat. Extent of temperature increase depends upon the amount of $CO_2$ added, the scale of operation and other factors which affect the dissipation of heat. However, over the range of about 20°–80° C. temperature conditions appear to have no major effect on the solubility of cobalt carbonate.

Slurry from the precipitation step is filtered as shown or subjected to some other mechanically equivalent solid-liquid separation step such as decantation and centrifugal separation. While not necessarily a limitation, separation by vacuum filtration is desirable. This removes excess $CO_2$ left in solution which, if not removed, might precipitate more cobalt during subsequent nickel recovery.

Usually the collected solids are washed. In so doing the amount of liquid should be minimized in order to avoid unnecessary dilution of the fluids handled in the subsequent steps. A good practice is to use a solution saturated with ammonium carbonate so as to remove any nickel which may be present. Ordinarily, the filtrate and the washings will be combined.

The filtrate will have a higher Ni: Co mol ratio than the feed. To be suitable for efficient production of nickel, this ratio should be at least about 1: 1 and preferably 5: 1 or higher in order to obtain substantial recovery of high purity nickel.

Dissolved contents of the filtrate, however, other than nickel and cobalt, may not necessarily be suitable for nickel reduction. Sufficient free ammonia must be present in the solution to form, in the case of nickel, a gas-reducible nickel complex. Preferably the nickel complex should contain about 1.5–2.5 amines although this ratio may be extended to six or even higher. These higher ratios, however, will increase the pH. This is undesirable since selective precipitation of nickel is favored at lower pH values.

Sufficient ammonia will usually be present as a result of the initial adjustment step. Additional ammonia for nickel complexing is also made available during the carbonation step. Seldom, if ever, therefore, will it be necessary to add ammonia to the filtrate. In some instances, to provide for most favorable nickel reduction, it may even be necessary or desirable to reduce the ammonia content.

After the carbonation step, carbonate content of the solution is too high to permit heating to nickel reduction temperatures without initiating cobalt carbonate precipitation. It may be necessary after carbonation and filtration, therefore, to reduce the carbonate content. Numerical limitations are difficult to define since the maximum carbonate concentration depends on ammonia concentration and also on the Ni and Co content of the filtrate. The permissible carbonate concentration, therefore, will be governed in each instance by the dissolved contents of the filtrate.

In general, there should also be at least about ½ mol of amine salt per mol of nickel plus cobalt, but usually not exceeding more than about 2 mols. In the absence of amine salt, cobalt hydroxide or basic sulfate may precipitate if the free ammonia is within the preferred range of 1.5–2.5 mols per mol of nickel plus cobalt. Since a low carbonate content is essential to avoid precipitation of cobalt carbonate, the amine salt must be other than the carbonate. As previously stated, the only other salt generally encountered in practice is the sulfate. If additional salt is needed, the sulfate should be added.

If adjustment of the dissolved constituents of the filtrate is required, it may be conducted in an adjustment step indicated on the drawing as a "second adjustment." Where reduction of the ammonia and carbonate contents is carried out, the excess may be conveniently recovered for reuse. As pointed out above, reduction of the carbonate content may occur in the solid-liquid separation. If such is the case and the other dissolved contents require no further adjustment, the adjustment step may be by-passed as shown.

The next step in the process is shown on the drawing as nickel reduction. Herein, the solution is treated under reducing conditions to precipitate a substantially cobalt-free nickel metal powder. Temperatures above about 250° F. are required, using a positive partial pressure of hydrogen from about 10 to about 1,000 pounds per sq. in. gauge. Product nickel powder is obtained substantially free from occlusions as a readily filterable and washed solid.

Precipitated powder is filtered out, washed and dried as shown on the drawing. Any solids-liquid separation may be substituted for filtration. Washing and drying are conventional procedures and need not be further described.

Filtrate from the solids-liquid separation contains nickel and cobalt amine carbonates in a low Ni: Co ratio. It is recycled for further recovery of the metal content. Washings contain valuable materials which may be recovered by recycling along with the filtrate. Alternatively, the washings may be treated by conventional procedures to recover the salts content, ammonia and the like.

The primary object of this invention, as previously disclosed, is the recovery of a high purity nickel metal powder from materials having a low Ni:Co mol ratio. It is an added advantage of this invention, however, that in the process of obtaining such a product, an easily marketable cobalt product may be obtained. This cobalt product is obtained from the first solids-liquid separation and is designated on the flow sheet as a cobalt carbonate concentrate. The amount of this concentrate obtained will depend upon the extent of Ni:Co mol ratio increase. It may be either sold as such, or calcined, in a conventional manner, to an oxide concentrate.

The following example will illustrate the use of the present invention.

*Example*

A solution containing 30 grams/liter of nickel and 50 grams/liter of cobalt as sulfates, about 0.5 mol/liter of ammonium sulfate, and 3.5 mols/liter of free ammonia is subjected to 50 p. s. i. of $CO_2$. Precipitation of cobalt carbonate is stopped after the Ni:Co ratio in the precipitate exceeds about 1:20. At this point about 50% of the cobalt content is precipitated. During carbonation the temperature rises to about 70° C. The resultant slurry is filtered under vacuum and washed. The combined filtrate and washings analyzes as follows:

| Solute | g./l. | m./l. |
|---|---|---|
| Co | 15 | 0.26 |
| Ni | 33 | 0.57 |
| $(NH_4)_2SO_4$ | 98 | 0.75 |
| $NH_3$ | 66 | 3.9 |
| $CO_2$ | 4.5 | 0.1 |

This solution is sufficiently low in $CO_2$ and high enough in ammonia so as to require no adjustment prior to nickel reduction. The solution is transferred to a stirred autoclave and subjected to a 300 p. s. i. partial pressure of hydrogen at about 200° C. for about one-half hour. About 70–80% of the nickel is precipitated as nickel metal powder containing less than 5% cobalt.

We claim:

1. In the hydrometallurgical separation of elemental nickel by gas reduction at superatmospheric temperature and pressure from a mixture containing soluble compounds of Ni and Co in metal ratio less than about 1:1, the method of pretreating such mixtures to obtain an Ni:Co ratio better adapted for Ni reduction and a cobalt values concentrate comprising: preparing an aqueous ammoniacal-ammonium salt liquor containing said mixture; adjusting the solutes content thereof to provide (a) sufficient ammonia and ammonium salt to retain all nickel in said mixture in solution at temperatures up to those adapted to effective gas reduction and (b) carbonate ions at least stoichiometrically equivalent to the dissolved cobalt in excess of a preselected Ni:Co ratio above about 1:1; separating resultant cobalt-bearing solids and then removing from residual liquor any carbonate ions in excess of the $CO_3$:Co ratio at which Co is insolubilized on heating to nickel reduction temperatures.

2. In the hydrometallurgical separation of elemental nickel by gas reduction at superatmospheric temperature and pressure from a mixture containing soluble compounds of Ni and Co in a metal ratio of less than about 1:1, the method of pretreating such mixtures to obtain an Ni:Co ration better adapted for Ni reduction and a cobalt values concentrate comprising preparing an aqueous ammoniacal-ammonium salt liquor containing said mixture; adjusting the solutes content thereof to provide (a) sufficient ammonia and ammonium salt to retain all nickel in said mixture in solution at temperatures up to those adapted to effective gas reduction and (b) carbonate ions at least stoichiometrically equivalent to the dissolved cobalt in excess of a preselected Ni:Co ratio above about 1:1; producing any increase in liquor temperature necessary to insure precipitation of said excess cobalt as cobalt carbonate; separating resultant cobalt bearing solids; and then removing from residual liquor any carbonate ions in excess of the $CO_3$:Co ratio at which Co is insolubilized on heating to nickel reduction temperatures.

3. In separating elemental nickel by preferential gas reduction at superatmospheric temperature and pressure, from mixtures containing soluble compounds of nickel and cobalt in a metal ratio less than about 1:1, the process which comprises: preparing an ammoniacal-ammonium salt liquor containing said mixture; adjusting the solutes content thereof to provide (a) ammonia and ammonium salt concentrations sufficient to retain in solution all nickel in said mixture and (b) a carbonate concentration at least equivalent to that necessary to insolubilize any cobalt in excess of that for a preselected Ni:Co ratio greater than about 1:1; subjecting said liquor to a separatory treatment, whereby a cobalt concentrate is obtained; adjusting the solutes content of residual liquor to contain (a) a $CO_3$:Co ratio insufficient to insolubilize cobalt on heating to temperatures adapted for nickel reduction, (b) an available-ammonia:dissolved Ni plus Co mol ratio of from about 1.5 to about 2.5, and, (c) at least about one-half mol of ammonium salt per mol of dissolved Ni plus Co; at above about 250° F., subjecting adjusted liquor to the action of a sulfur-free reducing gas, whereby nickel metal powder is precipitated; and separating and collecting resultant product nickel powder.

4. In separating elemental nickel by preferential gas reduction at superatmospheric temperature and pressure, from mixtures containing soluble compounds of nickel and cobalt in a metal ratio less than about 1:1, the process which comprises: preparing an ammoniacal-ammonium salt liquor containing said mixture; adjusting the solutes content thereof to provide (a) ammonia and ammonium salt concentrations sufficient to retain in solution all nickel in said mixture and (b) a carbonate concentration at least equivalent to that necessary to insolubilize any cobalt in excess of that for a preselected Ni:Co ratio greater than about 1:1; subjecting said liquor to a separatory treatment, whereby a cobalt concentrate is obtained; adjusting the solutes content of residual liquor to contain (a) a $CO_3$:Co ratio insufficient to insolubilize cobalt on heating to nickel reduction temperatures, (b) an available-ammonia:dissolved Ni plus Co mol ratio of from about 1.5 to about 2.5, and, (c) at least about one-half mol of ammonium salt per mol of dissolved Ni plus Co; at above about 250° F., subjecting adjusted liquor to the action of a sulfur-free reducing gas, whereby nickel metal powder is precipitated; separating and collecting resultant product nickel powder and recycling residual solution.

References Cited in the file of this patent
UNITED STATES PATENTS

| | | |
|---|---|---|
| 2,290,313 | Caron | July 21, 1942 |
| 2,531,336 | Hills et al. | Nov. 21, 1950 |